Figure 1:
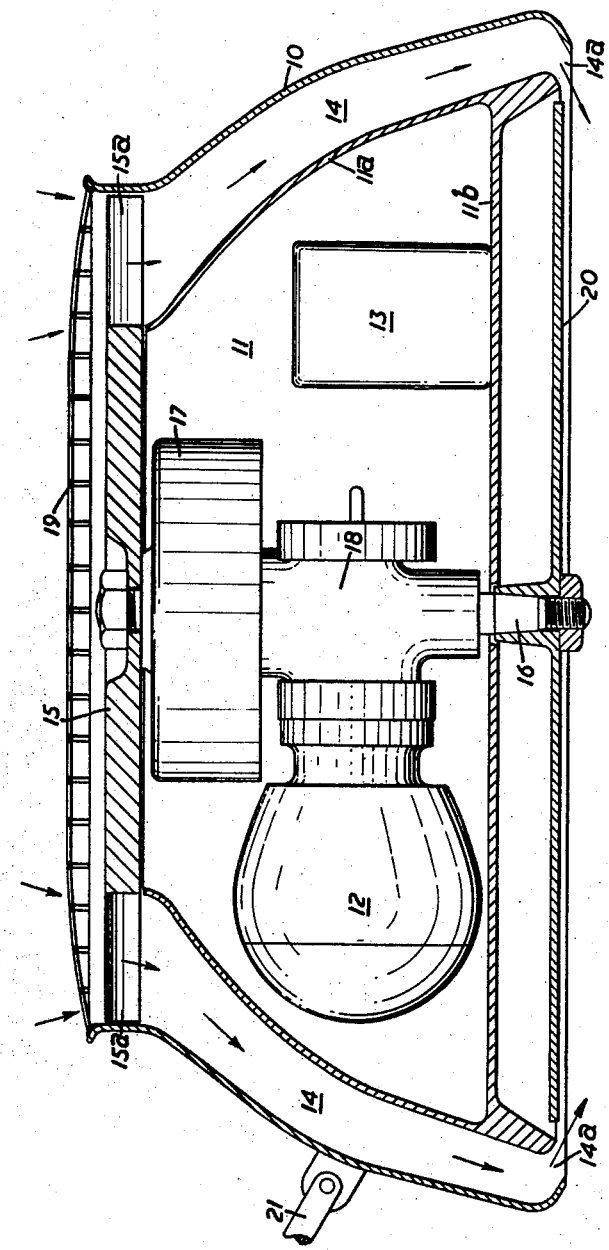
Figure 2:
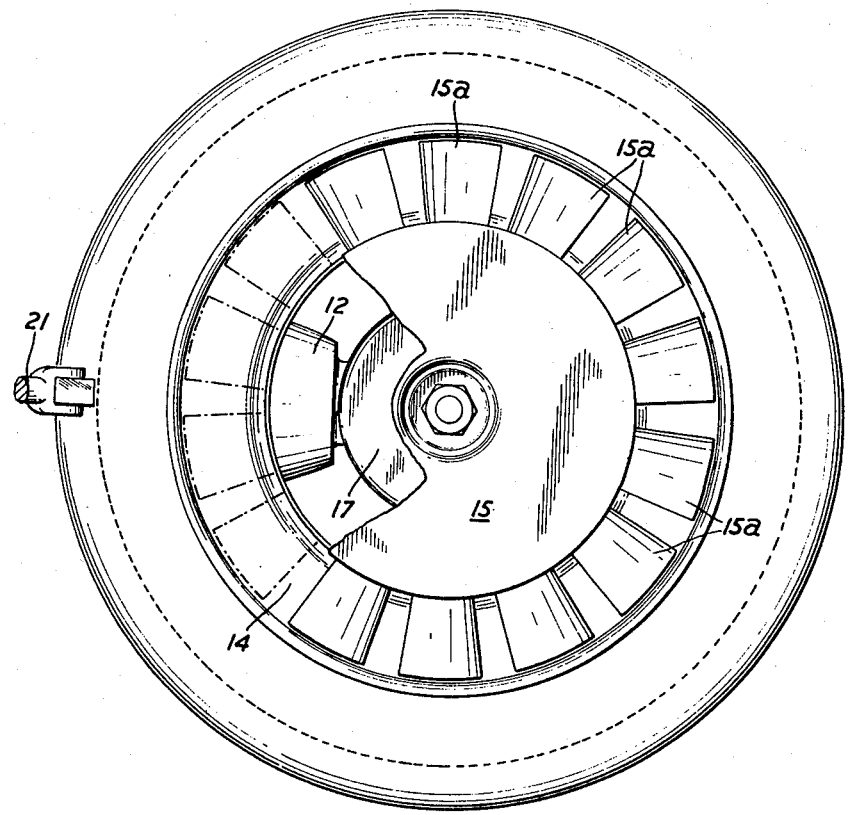

June 1, 1965 B. S. HANSOM 3,186,151
CUTTERS FOR GRASS AND OTHER VEGETABLE MATTER
Filed Jan. 30, 1963 2 Sheets-Sheet 1

INVENTOR
BERNARD STEPHEN HANSOM.
BY
Mason, Mason & Albright
ATTORNEY

June 1, 1965  B. S. HANSOM  3,186,151
CUTTERS FOR GRASS AND OTHER VEGETABLE MATTER
Filed Jan. 30, 1963
2 Sheets-Sheet 2

INVENTOR
BERNARD S. HANSOM
BY
Mason, Mason & Albright
ATTORNEYS

3,186,151
CUTTERS FOR GRASS AND OTHER
VEGETABLE MATTER
Bernard S. Hansom, Old Windsor, England, assignor to Wilkinson Sword Limited, London, England, a British company
Filed Jan. 30, 1963, Ser. No. 254,929
3 Claims. (Cl. 56—25.4)

This invention relates to cutters for grass and other vegetable matter.

According to the present invention there is provided a machine for cutting grass and like vegetable matter comprising an outer shell, an inner shell, said inner shell being coaxial with said outer shell and of smaller cross-section to form a passage of annular cross-section between said inner shell and said outer shell, a motor mounted within said inner shell, an air-compressor rotor mounted adjacent the upper end of said passage, said motor being coupled to said air-compressor rotor to rotate said air-compressor rotor for driving air through said annular section passage whereby an annular jet of compressed air is formed at the lower end of said passage providing an air-cushion between the machine and ground, and a rotary cutting member mounted on the underside of said inner shell, said rotary cutting member also being coupled to said motor.

The invention also provides a machine for cutting grass and like vegetable matter, comprising an outer shell, an inner shell, said inner shell being coaxial with said outer shell and of smaller cross-section to form a passage of annular cross-section between said inner shell and said outer shell, a motor mounted within said inner shell, an axial-flow air-compressor rotor mounted at the upper end of the passage, means defining an intake for the compressor rotor so arranged that, in operation, air is drawn in through the intake in a substantially vertical direction, said motor being coupled to said air-compressor rotor to rotate said air-compressor rotor for driving air through said annular section passage whereby an annular jet of compressed air is formed at the lower end of said passage providing an air-cushion between the machine and ground, and a rotary cutting member mounted on the underside of said inner shell, said rotary cutting member also being coupled to said motor.

The invention further provides a cutter for grass and other vegetable matter comprising a cutter member, a motor, an air compressor adapted to be driven by said motor, said cutter member being driven either by said motor or by a further motor, and means for directing compressed air from the outlet of said compressor to form an air cushion supporting said cutter above the surface from which said grass or other vegetable matter is upstanding.

One construction of cutter in accordance with the present invention will now be described, by way of example, with reference to the accompanying drawing which is a section through the middle of the cutter.

The construction of cutter to be described is designed to perform the grass cutting normally performed by conventional lawn mowers but as will be apparent hereafter can also be used for cutting other vegetation.

In contrast to conventional grass cutters, the cutters in accordance with the invention are supported above the ground by an air cushion. Thus, in one form the power unit used to drive the grass cutting mechanism may also be used to generate the air cushion.

The cutter may comprise a generally cylindrical body or outer shell 10 having an inner housing 11, closed at its lower end by an integral base 11b, in which is mounted the power unit 12 which may, for example, be an internal combustion engine, or an electric motor. The housing 11 also contains a compartment 13, supported by the base 11b, which in the case of a liquid fuel engine serves as a fuel storage tank and in the case of a battery driven electric motor contains the storage battery. Of course, if the power unit is an electric motor, instead of having its own battery (or in addition thereto) it may be provided with a lead for connection to an external power supply.

The peripheral wall 11a of the inner housing or shell 11 and the adjacent wall of the body 10 are so shaped as to form therebetween a passage 14 of annular cross-section. The cross-section of this duct 14 decreases from its upper end to its lower end and at the latter the wall of the body 10 is shaped to provide a discharge nozzle 14a which directs air radially inwards, for example at an angle of 30° of arc to the horizontal. Centrally mounted above the inner housing 11 and driven by the power unit 12 is a compressor rotor having a rotor disc 15 on the periphery of which are mounted a number of blades 15a which rotate in an annular path above the inlet of the passage 14. The roto disc 15 is mounted on the upper end of a shaft 16 carrying a flywheel 17 and connected through gearing which is protected by housing 18 to a power unit 12. When the compressor rotor is rotated by the power unit 12, air is drawn in and compressed and supplied through the passage to the discharge nozzle 14a. The resultant annular section jet provides a peripheral seal retaining a cushion of air which supports the cutter above the ground.

A protective grille 19 is mounted above the compressor rotor. Rotatably mounted below the base 11b of the inner housing 11 is a rotary cutter member 20 which is mounted on the same shaft 16 as the compressor rotor disc 15. Of course, the rotary cutter member 19 may be separately mounted and driven directly or indirectly from the same or another power unit. Furthermore, the cutter member may take other forms.

In use, air is ejected through the annular discharge nozzle 14a with sufficient force to raise the cutter above the ground to enable the rotary cutter member 20 to cut grass or other vegetable matter.

To guide the cutter and, if necessary, to prevent undesired rotation, a handle 21 is attached to the body 10.

A control may be provided for controlling the speed of the power unit to vary the height of the cutter but other means of varying its height may also be provided, for example by varying the width of the opening of the discharge nozzle 14a or by having means for by-passing a proportion of the air drawn in by the compressor. Moreover, to provide propulsive force for forward movement of the cutter, means may be provided for directing a proportion of the compressed air in an appropriate direction, the air thus directed being controllable to vary the speed and/or direction of travel of the cutter.

It will be appreciated that because the cutter rides on an air cushion, it can be used in conditions where conventional cutters cannot be used because of the damage they would do to a lawn, for example because of the damp condition of the lawn. Moreover, it can cut right to the edge of a lawn in contrast to conventional cutters travelling on wheels. It can, moreover, be used without difficulty on slopes of considerable angles.

A part of the unoccupied space within the housing 11 may be formed into a compartment for receiving the cut grass or other vegetable matter. A duct will be provided in the base 11b to bleed-off air from the space below the cutter, the air carrying the cut grass into the receiving compartment. The air flow from the annular discharge nozzle 14a to the duct in the base 11b will also serve to raise grass which may have been flattened and which for this reason might otherwise not be cut.

I claim:
1. A machine for cutting grass and like vegetable matter comprising an outer shell, an inner shell, said inner shell being coaxial with said outer shell and of smaller cross-section to form a passage of annular cross-section between said inner shell and said outer shell, a motor mounted within said inner shell, an air-compresser rotor mounted adjacent the upper end of said passage, said motor being coupled to said air-compressor rotor to rotate said air-compressor rotor for driving air through said annular section passage whereby an annular jet of compressed air is formed at the lower end of said passage providing an air-cushion between the machine and ground, and a rotary cutting member mounted on the underside of said inner shell, said rotary cutting member also being coupled to said motor.

2. A machine for cutting grass and like vegetable matter, comprising an outer shell, an inner shell, said inner shell being coaxial with said outer shell and of smaller cross-section to form a passage of annular cross-section between said inner shell and said outer shell, a motor mounted within said inner shell, an axial-flow air-compressor rotor mounted at the upper end of the passage, means defining an intake for the compressor rotor so arranged that, in operation, air is drawn in through the intake in a substantially vertical direction, said motor being coupled to said air-compressor rotor to rotate said air-compressor rotor for driving air through said annular section passage whereby an annular jet of compressed air is formed at the lower end of said passage providing an air-cushion between the machine and ground, and a rotary cutting member mounted on the underside of said inner shell, said rotary cutting member also being coupled to said motor.

3. A machine for cutting grass and like vegetable matter, comprising an outer shell, an inner shell, said inner shell being coaxial with said outer shell and of smaller cross-section to form a passage of annular cross-section between said inner shell and said outer shell, a motor mounted within said inner shell, an axial-flow air-compressor rotor mounted at the upper end of the passage, means defining an intake for the compressor rotor so arranged that, in operation, air is drawn in through the intake in a substantially vertical direction, means defining an annular inwardly directed nozzle at the lower end of the passage whereby an annular jet of compressed air is discharged from the nozzle to form an air cushion between the machine and the ground, and a rotary cutting member mounted on the underside of said inner shell, said rotary cutting member also being coupled to said motor.

References Cited by the Examiner
UNITED STATES PATENTS

| | | | |
|---|---|---|---|
| 2,796,714 | 6/57 | Denney | 56—25.4 |
| 3,050,146 | 8/62 | Crim | 180—7 |
| 3,067,967 | 12/62 | Barr | 180—7 |
| 3,110,996 | 11/63 | Dahlman | 56—25.4 |

T. GRAHAM CRAVER, *Primary Examiner.*
ANTONIO F. GUIDA, *Examiner.*